United States Patent [19]

Macchiarulo et al.

[11] Patent Number: 5,460,477
[45] Date of Patent: Oct. 24, 1995

[54] PROCESS AND APPARATUS FOR HANDLING DRIVING BELTS IN AN AUTOMATED MANNER

[75] Inventors: Vincenzo Macchiarulo, Pescara; Angelo Ronco, Bosconero, both of Italy

[73] Assignee: Pirelli Trasmissioni Industriali S.p.A., Milan, Italy

[21] Appl. No.: 288,161

[22] Filed: Aug. 10, 1994

Related U.S. Application Data

[63] Continuation of Ser. No. 793,731, Nov. 21, 1991, abandoned.

[30] Foreign Application Priority Data

Nov. 21, 1990 [IT] Italy ..................... 22123/90

[51] Int. Cl.$^6$ ............................................ B65G 59/00
[52] U.S. Cl. ................ 414/786; 414/798.9; 414/27; 414/908; 414/222; 156/137
[58] Field of Search ....................... 414/27, 788.1, 414/403, 798.9, 798.2, 404, 798.3, 418, 798.7, 796, 908, 786, 787, 222; 198/817, 469.1, 418, 418.7, 431, 470.1, 604, 605, 620; 156/137

[56] References Cited

U.S. PATENT DOCUMENTS

| | | | |
|---|---|---|---|
| 3,626,818 | 12/1971 | Anson | 414/798.9 X |
| 3,702,138 | 11/1972 | Abrahamsson et al. | 414/908 X |
| 3,811,549 | 5/1974 | Preisig | 414/798.9 X |
| 4,014,428 | 3/1977 | Ossbahr . | |
| 4,364,466 | 12/1982 | Mojden | 414/798.9 X |
| 4,566,834 | 1/1986 | Baba et al. | 414/27 |
| 4,589,811 | 5/1986 | Riccardo et al. | 414/27 X |
| 4,790,719 | 12/1988 | Portalupi et al. | 414/27 X |
| 4,865,509 | 9/1989 | Carlton | 414/908 X |

FOREIGN PATENT DOCUMENTS

673770   3/1939   Germany ................................ 414/27

*Primary Examiner*—Frank E. Werner
*Attorney, Agent, or Firm*—Stevens, Davis, Miller & Mosher

[57] ABSTRACT

An apparatus for handling a plurality of driving belts 2 disposed close to each other and hanging from a horizontal supporting bar 4 carried by a handling support 3 in a loading station 10. The belts are laterally engaged, from opposite sides, between two first dragging elements 26 adapted to be simultaneous moved close to each other from opposite sides relative to the belts 2. The belts 2 are elastically deformed by the dragging elements and thereby take a configuration having two vertically aligned loops 38, 39 widening in a direction away from the dragging elements 26. The dragging elements 26 are trained around respective idler pulleys 27, 28, 31 operable for causing the displacement of the belts 2 and the selective transferring of the belts to second dragging elements 42 that will convey the belts to different work stations 5, 5aa according to a predetermined sequence.

9 Claims, 6 Drawing Sheets

PROCESS AND APPARATUS FOR HANDLING DRIVING BELTS IN AN AUTOMATED MANNER

This application is a Continuation of application Ser. No. 07/793,731, filed Nov. 21, 1991, now abandoned.

CROSS REFERENCE TO RELATED APPLICATIONS AND PATENTS

This invention is related to the assignee's following U.S. Patents and Application, the disclosure of which are hereby incorporated by reference:

U.S. Pat. No. 5,198,068 entitled PROCESS AND APPARATUS TO APPLY IDENTIFICATION INSCRIPTIONS ON SLEEVES MADE OF ELASTOMERIC MATERIAL IN THE MANUFACTURE OF DRIVING BELTS U.S. Pat. No. 5,217,562 entitled MACHINE FOR COILING AND WINDING TUBULAR SLEEVES OF ELASTOMERIC MATERIAL INCORPORATING REINFORCING FIBERS U.S. Pat. No. 5,311,778 entitled PROCESS AND APPARATUS TO IDENTIFY THE PRESENCE OF STRUCTURAL CAVITIES IN SLEEVES FOR THE MANUFACTURE OF DRIVING BELTS U.S. Pat. No. 5,321,256 entitled PROCESS AND APPARATUS FOR INSPECTING JUNCTIONS IN SLEEVE LINING FABRICS FOR THE MANUFACTURE OF TOOTHED BELTS U.S. Pat. No. 5,243,532 entitled PROCESS FOR THE CONTROL OF THE QUALITY AND OF THE PRODUCTION OF TRANSMISSION BELTS U.S. Pat. No. 5,247,463 entitled PROCESS AND APPARATUS FOR INSPECTING THE GEOMETRICAL CONFIGURATION OF TOOTHED DRIVING ELEMENTS

BACKGROUND OF THE INVENTION

The present invention relates to a process and an apparatus for handling driving belts in an automated manner during the manufacturing of such belts.

In greater detail, the process and apparatus in question are used in factories where the driving belt production takes place, in order to transfer the belts, according to a predetermined order, between different work stations such as for example apparatuses for quality control and/or belt packaging.

It is known that in the manufacture of driving belts in general, belts obtained from an axially elongated cylindrical tubular sleeve made of elastomeric material incorporating textile reinforcement structures as a result of axially spaced circumferential cutting operations carried out thereon, are afterwards transferred to different processing stations, for example to undergo finishing work, tests for quality control and/or packaging operations for distribution on the market.

Presently transport of belts between the various work stations provides for the aid of appropriate handling supports carrying a supporting bar in cantilevered fashion from which the belts are suspended in mutual side by side relation.

The handling supports are adapted to be easily transported, by hand or by small motor vehicles moving along predetermined paths, to bring the belts from one work station to another.

However, it is noted that in a great number of said work stations the manual intervention of an operator is necessary to carry out the transferring of the individual belts from the handling support to the various members arranged at the corresponding work station, and vice versa.

This necessity involves important down ties in production and high main-power costs. In particular it is disadvantageous because it constitutes in itself a strong restriction to increased production automation.

The presence of an operator is in fact also necessary when apparatuses are involved that, should they be interlocked to means capable of automatically carrying out the above specified belt-transferring operations, could be able to operate in a completely automated manner.

It is however to be pointed out that the achievement of automatic means capable of accomplishing the desired transferring functions are hindered by a great number of technical problems.

Actually, first of all it is necessary to find a way make the belts hanging from the handling support to be easily grasped by possible gripping members associated with the apparatuses carrying out the belt workings. In this connection it is to be noted that there are particular work stations, such as the stations in which the quality control on the belts is carried out, that are designed to act selectively only on some of the belts carried by the handling support.

It is therefore necessary to find a way to separate the belts that must be submitted to the test relating to the quality control from those that on the contrary do not need to be tested.

Still with reference to the quality test, by way of example only, it is also necessary to carry out another separation between the belts that have shown unacceptable defects and those that, on the contrary, have got through the test.

SUMMARY OF THE INVENTION

The main object of the present invention is to solve the problems of the known art by providing a process and an apparatus capable of efficiently meeting the above requirements.

The foregoing and further objects that will become more apparent in the course of the following description are substantially attained by a process for handling driving belts in an automated manner, characterized in that it comprises the following steps:

engaging a plurality of driving belts about a horizontal supporting bar holding them up at one upper end thereof;

elastically deforming the belts by pushing first transferring elements against the belts themselves laterally from opposite sides, which first elements are parallel to the supporting bar in order to give each belt a configuration exhibiting an upper loop and a lower loop in vertical alignment and widening away from said first dragging elements;

moving the belts according to the longitudinal extension of the supporting bar through the displacement of the first dragging means.

Still in accordance with the present invention the apparatus to put into practice the process for handling driving belts in an automated manner is characterized in that it comprises:

a loading station arranged to engage a handling support carrying in cantilevered fashion a horizontal supporting bar on which a plurality of driving belts is engaged in mutual alignment;

at least one transferring unit having a pair of first dragging elements disposed in coplanar relation, passing over respective guide pulleys operable in rotation and exhibiting respective active stretches facing each other in parallel and simultaneously movable from a rest condition in which they are spaced apart from each other to enable said belts to be inserted therebetween and an operating condition in which they are disposed close to each other to engage the belts laterally from opposite sides so as to elastically deform them according to a configuration showing an upper loop and a lower loop in vertical alignment at least said upper loop having its maximum width greater than the distance between said active stretches.

BRIEF DESCRIPTION OF THE DRAWINGS

Further features and advantages will become more apparent from the detailed description of a preferred embodiment of a process and an apparatus for handling driving belts in an automated manner, in accordance with the present invention, given hereinafter by way of non-limiting example with reference to the accompanying drawings, in which.

DETAILED DESCRIPTION OF A PREFERRED EMBODIMENT

Figure 1:
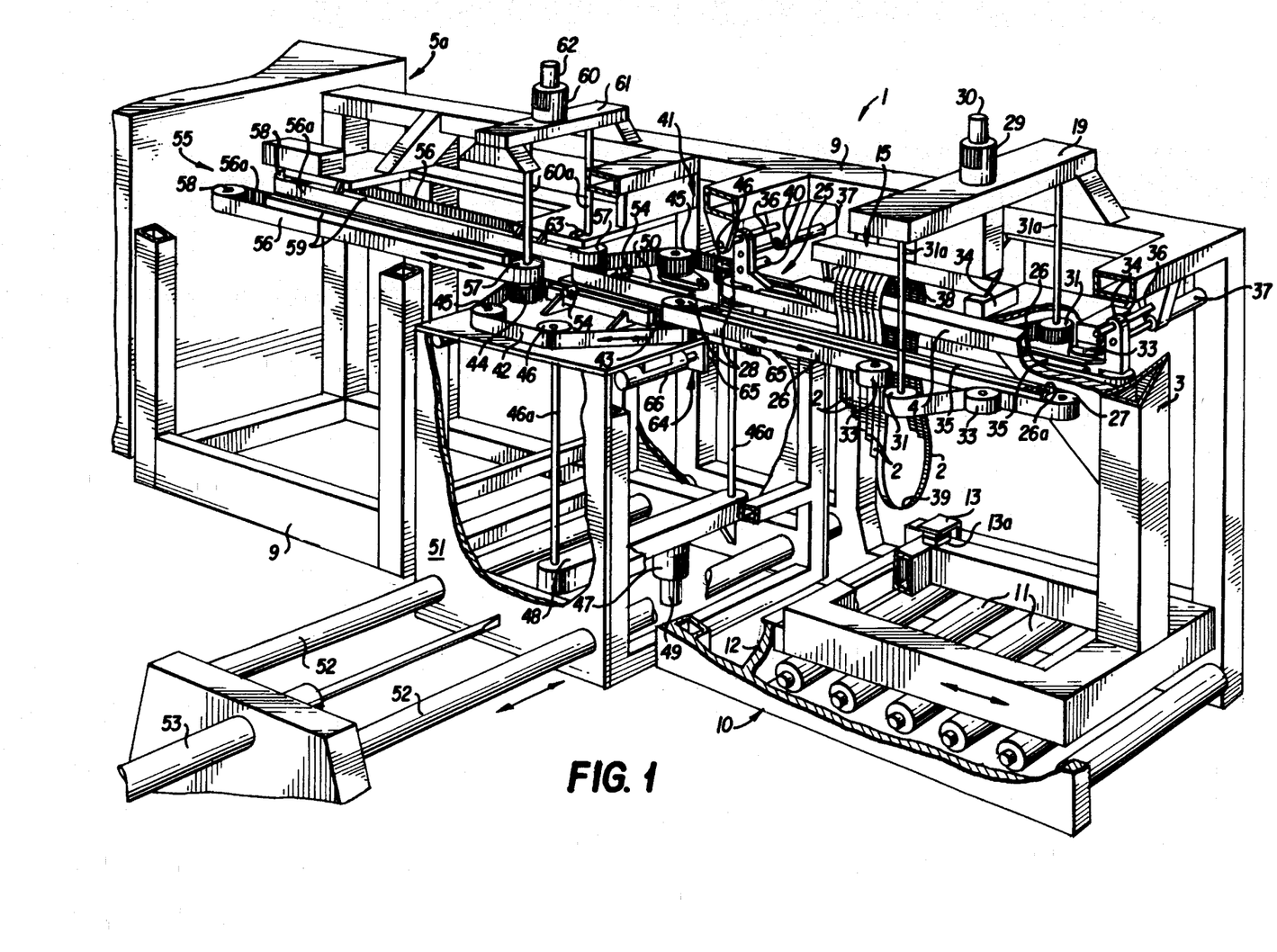
FIG. 1 is a fragmentary perspective view of an apparatus designed for the automated transferring of driving belts, in accordance with the present invention.

Referring to the drawings and in particular to FIG. 1, an apparatus for the automated handling of driving belts in accordance with the present invention has been generally identified by reference numeral 1.

Apparatus 1 is adapted to pick up a plurality of driving belts 2 from a handling support 3 used to transport the belts at the inside of the factory in which the apparatus 1 is installed.

Figure 3:
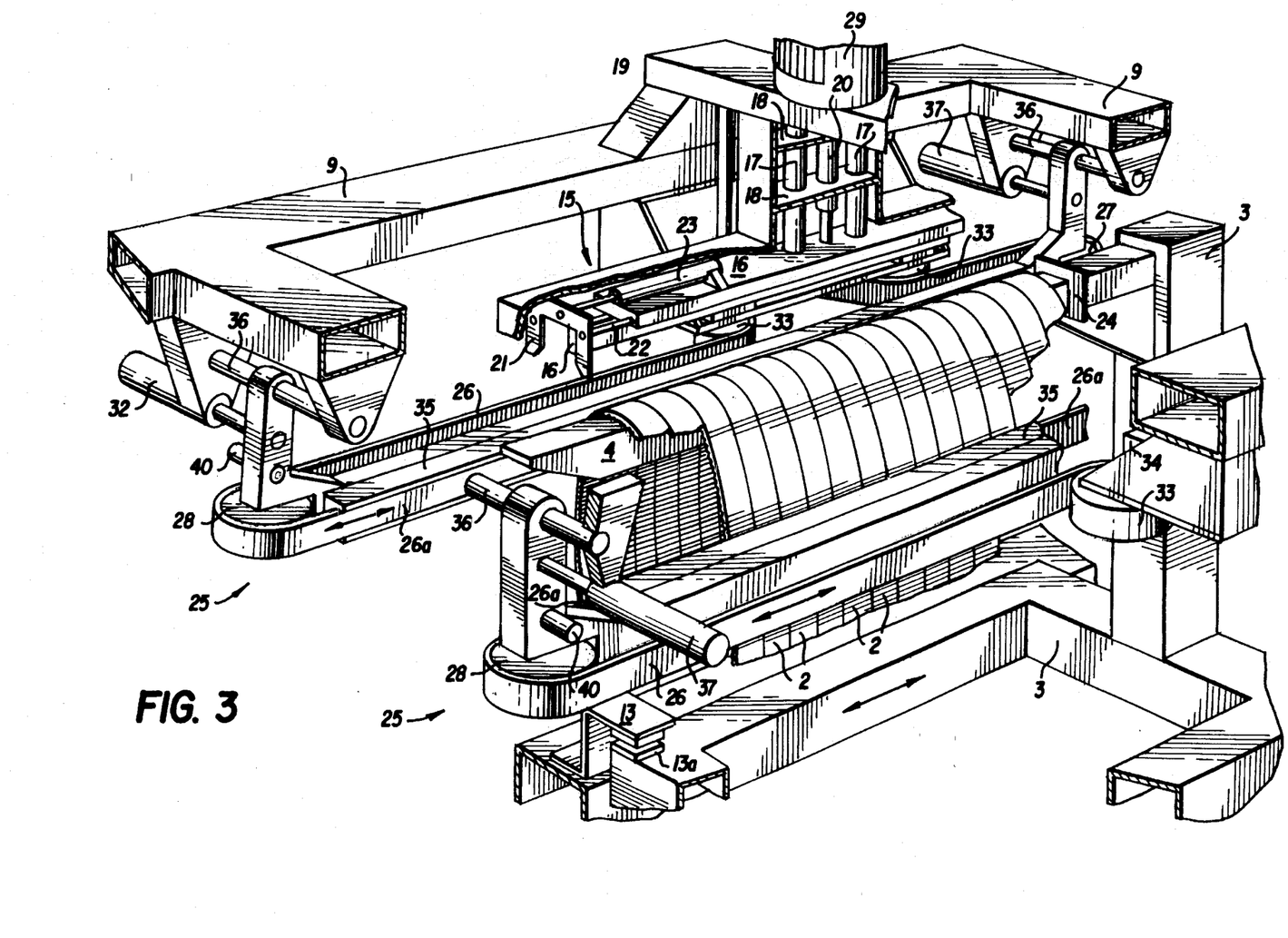
FIG. 3 is a perspective view from the opposite side relative to FIG. 1, showing the structure of the first transferring unit.

For the purpose, the handling support 3 carries a supporting bar 4 in cantilevered fashion, on which bar belts 2, (the belts having been conventionally obtained by cutting operations carried out on a single manufactured article in the form of a tubular sleeve) have been previously engaged so that they are hanging from said bar at the upper ends thereof, as shown in FIG. 3.

Figure 2:
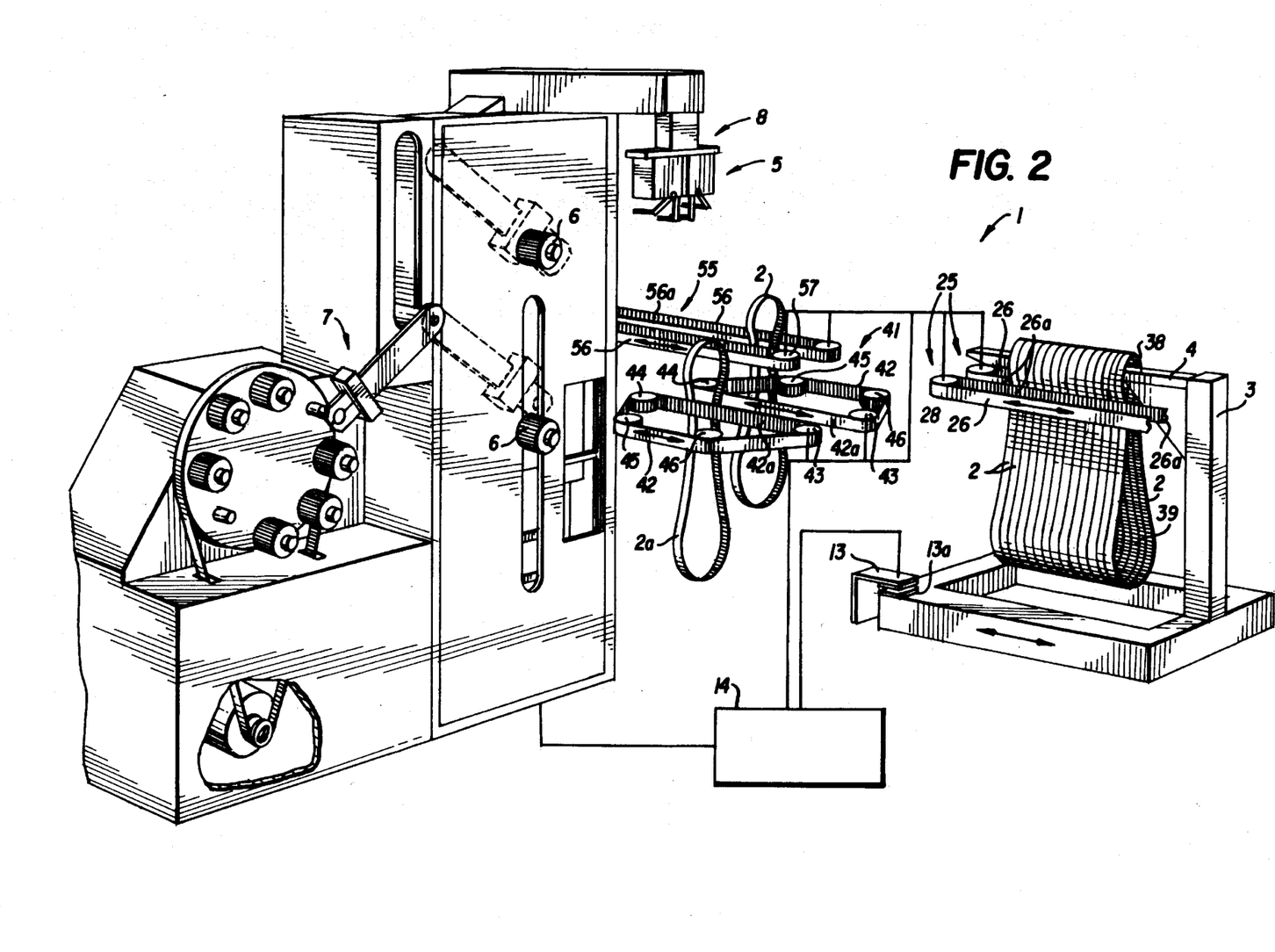
FIG. 2 is a perspective view diagrammatically showing, by way of example only, the apparatus in reference associated with a work station in which quality tests are carried out oil the driving belts.

In the embodiment shown at least part of the belts 2 picked up from the handling support 4 is designed to be submitted to a quality control test at an appropriate work station generally denoted by 5 in FIG. 2, combined with the apparatus 1 in reference.

In this work station 5 two pulleys 6 are substantially provided and they can be positioned to the desired distance from each other and are interchangeable depending upon the type of belts 2 being worked, being acted upon by set up means 7 having a completely automated operation.

The belts 2 that must be submitted to quality control tests are engaged on pulleys 6 by an automatically operated handling unit 8 and, based on the test results, they are subsequently sent to a packaging station 5a only diagrammatically shown as not of importance to the ends of the invention, or rejected.

The work station 5 where the quality control tests are carried out is not further described since it is shown by way of example only and at all events it has already been widely discussed in the above identified copending U.S. and Italian Patent Applications in the section "Cross Reference to Related Applications". The disclosures of such applications are hereby incorporated by reference.

Apparatus 1 is comprised of a supporting framework 9 at one end of which a loading station 10 is defined which is adapted to operatively engage the handling support 3 by a plurality of slide rollers 11 disposed in parallel and in side by side relation according to axes perpendicular to the longitudinal extension of the supporting bar 4.

The slide rollers 11 are designed to guide the handling support 3 so as to dispose it according to a predetermined positioning, against an abutment element 12.

Advantageously, as can be seen from FIGS. 1 and 2, associated with the handling support 3 is a magnetic card 13a in which data relating for example to the size features of the belts 2 carried by the handling support are stored, as well as other possible data indicating which of the belts 2 must be submitted to the quality control test.

These data are detected by a reading member 13 associated with the loading station 10, and then transmitted to an electronic control box 14 carrying out the whole operating management of apparatus 1, as well as of the work stations 5, 5a.

Preferably, compacting means 15 is provided to operate above the loading station 10, which means is arranged to act on the driving belts 2 engaged to the supporting bar 4 to cause the belts originally having an undetermined mutual distance to move close to each other in abutment relationship.

For the purpose the compacting means comprises, as clearly shown in FIG. 3, a counterbar 16 extending longitudinally over the supporting bar 4, slidably guided in a vertical direction by two guide bars 17 fastened to the counterbar itself and slidably engaging through plates 18 rigidly connected to one bridge-shaped crosspiece 19 stiffly supported by the framework 9.

Figure 5:
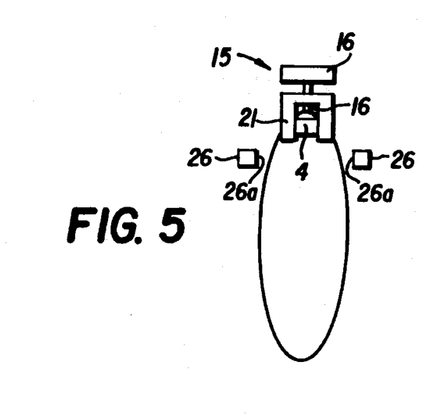
FIGS. 5 and 6 are diagrammatic front views showing the execution of two first operating steps carried out on the belts in the region of the first transferring unit.

The counterbar 16 is vertically movable upon command of a vertical-displacement actuator 20, from a rest position in which, as shown in FIG. 3, it is raised relative to the belts 2 carried by the supporting bar 4, to an operating position in which, as shown in FIG. 5, acts on the upper ends of the belts to hold them in coplanar relation preventing possible lifting of the same from the supporting bar 4.

It is to be noted that when the counterbar 16 is in the operating position, it is spaced apart from the supporting bar 4 by a greater amount than the belt 2 thickness.

In this manner, by virtue of the bending exhibited by the belt extension, there is a free space between each belt 2 and the supporting bar 4, so that the belts can freely slide therealong.

The compacting means 15 further comprises at least a substantially fork-shaped pusher element 21, slidably engaged to one end of the counterbar 16 through horizontal guide bars 22.

When the counterbar 16 is in the operating position, the pusher element 21 can be longitudinally moved on the supporting bar 4, upon command of a fluid-operated compacting actuator 23 fastened to the counterbar so that the belts are urged, in mutual abutment relationship, against a fixed locator 24, preferably arranged on the supporting bar 4.

A first transferring unit generally identified by 25 also acts close to the loading station 10, which unit is provided with a pair of first dragging elements 26 consisting, for example, of a pair of toothed belts symmetrically disposed in a common horizontal plane.

Each of the first dragging elements 26 is operatively trained around a first guide pulley 27 and a second guide pulley 28 aligned in a direction parallel to the supporting bar 4.

A first driving motor 29, mounted to the first bridge-shaped crosspiece 19 and controlled by an encoder 30 interlocked to the control box 14 is operatively connected to first propeller shafts 31a each associated with a third guide pulley 31 operatively connected to one of the first dragging elements 26.

Corresponding to the operation of the first driving motor 29 is the simultaneous operation of the third guide pulleys 31 according to respectively opposite rotational directions.

In addition, one or more tensioning pulleys 33 act on each of the first dragging elements 26, which pulleys are connected to the supporting framework 9 after the interposition of spring load devices 34, not shown in detail as known per se and conventional, capable of ensuring the constant adhering of the dragging element 26 to the respective guide pulleys 27, 28 and 31.

The first dragging elements 26 exhibit respective active stretches 26a facing each other and parallel to, the longitudinal extension of the supporting bar 4.

Each of the active stretches 26a is supported, along the whole longitudinal extension thereof, by a first guide counter-element 35 disposed towards the inner extension of the corresponding dragging element 26.

Each guide counter-element 35, as viewed from FIG. 3, is supported by transverse guide bars 36 slidably connected to the framework 9.

Transverse-displacement fluid-operated actuators 37 act on the guide counter-elements 35 to move the active stretches 26a of the dragging elements 26 at right angles to the longitudinal extension of the supporting bar 4, from a rest condition in which they are moved apart from each other to enable tile belts 2 to be inserted therebetween, on engagement of the handling support 3 in the loading station 10, to an operating condition in which they are located close to each other so as to operatively engage the belts.

Figure 6:
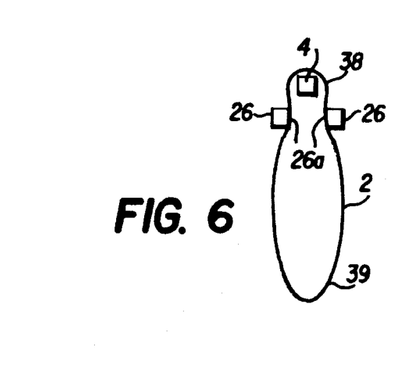

In greater detail, as clearly viewed from FIG. 6, when the dragging stretches 26a are brought to the operating position, they act laterally from opposite sides on the individual belts 2 and elastically deform them according to a configuration exhibiting an upper loop 38 and a lower loop 39 vertically aligned and widening away from the dragging stretches. (See also FIG. 6.)

In this manner, at least the upper loop 38 has a maximum width greater than the mutual distance between the dragging stretches 26a, so as to prevent the respective belt 2 from falling and slipping between the active stretches.

It is also to be noted that, due to the moving close to each other of the active stretches 26a in the operating condition, the formation of the upper loop 38 on each belt 2 gives rise to a slight rising of the upper belt portion from the supporting bar 4.

Belts 2 engaged as above described by the first dragging elements 26 can be moved longitudinally on the supporting bar 4 and slipped off due to the operation of the first driving motor 29. At least a first photoelectric cell 40 acting in the region of the second guide pulleys 28 detects the passage of belts 2 at the end of the first transferring unit 25 located opposite the handling support 3.

A second transferring unit, generally identified at 41, operates continuously to the first transferring unit 25 and it has a pair of second dragging elements 42 disposed in symmetrically opposite positions according to a horizontal common plane and each engaging about a first and a second guide pulley 43, 44 that are aligned according to a direction parallel to the alignment direction of the first and second guide pulleys 27, 28 belonging to the first transferring unit 35.

The first and second guide pulleys 43, 44 of the second transferring unit 41 therefore define, on the extension of the respective second dragging elements 42, active stretches 42a facing each other, parallel to the active stretches 26a of the first dragging elements 26 and spaced apart from each other by the same distance as the active stretches 26a of the first dragging elements in the operating condition.

The active stretches 42a of the second dragging elements 42 as well are guided on respective guide counter-elements 50 each facing the inner extension of the corresponding dragging element 42.

In the example shown, each of the second dragging elements 42 is also engaged with an auxiliary guide wheel 45 and a powered guide wheel 46 setting in rotation the second dragging element 42.

When the powered guide wheels 46 associated with both of the second dragging elements 42 are set in rotation, they are driven in rotation, through interposition of respective shafts 46a, by a second driving motor 47 mounted under the second bridge-shaped crosspiece 48 located at the base of the second transferring unit 41.

On operation of the second motor 47, controlled by a second encoder 49 interlocked to the electronic control box 14, the powered pulleys 46 are operated too and they rotate in opposite directions.

Advantageously, all members belonging to the second transferring unit 41 are mounted on an auxiliary framework 51 slidably engaged to respective guides 52 fastened to the supporting framework 9.

In this way, the second transferring unit may be moved for example upon command of a fluid-operated displacement actuator 53, from a first position in which, as shown in FIG. 1, it is substantially in alignment with the extension of the first transferring unit 25, to at least a second position in which it is moved apart from but parallel to the first transferring unit.

In the embodiment shown the slide guides 52 are oriented in a horizontal direction at right angles to the extension of the active stretches 42a of the second dragging elements 42.

Therefore the displacement of the second transferring unit 41 takes place in a horizontal direction and perpendicular to the longitudinal extension of the active stretches 26a of the first dragging elements 26.

The displacement of the second unit, although not shown in the drawings can take place upwardly or downwardly in the vicinity of a control or finishing station.

In greater detail, as can be observed by comparing FIGS. 1 and 2, when the second transferring unit 41 is in the first work position the first guide pulleys 43 of the second dragging elements 42 are disposed coaxially under the second guide pulleys 28 of the first dragging elements 26.

In the second work position, to the contrary, the second transferring unit 41 is disposed in front of the work station 5 in order to make one of the belts 2 ready to be picked up by the handling unit 8 and submitted to a quality control test, as is more clearly shown as follows:

At least a second photoelectric cell 54 supported by the guide counter-elements 50 associated with the second dragging elements 42 detects the passage of the individual belts 2 along the second transferring unit 41, for the purposes to be clarified in the following.

In a preferred embodiment, apparatus 1 further comprises a third transferring unit 55 comprising third dragging elements 56 each operatively engaged about a first guide pulley 57 and a second guide pulley 58 in alignment with the first and second guide pulleys 27, 28 belonging to the first transferring unit 25. The third dragging elements 56 as well are symmetrically disposed according to a horizontal plane and have respective active stretches 56a engaged along guide counter-elements 59 fastened to the supporting framework 9 and facing the inner extension of the respective dragging elements 56.

The active stretches 56a of the third dragging elements 56 are disposed in parallel and in alignment with the active stretches 26a of the first dragging elements 26.

The first guide pulleys 57 are simultaneously operable in rotation in opposite ways and upon interposition of respective shafts 60a, being acted upon by a third driving motor 60 fastened to a third bridge-shaped crosspiece 61 located on top of the supporting framework 9.

A third encoder 62 connected to the electronic control box 14 controls the movements of the third dragging elements 56 through the motor 60.

As can be easily understood from the accompanying drawings, the first guide pulleys 57 of the third transferring unit 55 are disposed in coaxial relation over the second guide pulleys 44 of the second transferring unit 41, when the latter is in the first operating position.

At least a third photoelectric cell 63 acts in register with the first guide pulleys 57 associated with the third transferring unit 55 so as to detect the transferring of belts 2 from the second dragging elements 42 to the third dragging elements 56.

Apparatus 1 further comprises first stopping means 64 acting close to a first threshold line "S'" (FIGS. 7 to 12) ideally defined between the first transferring unit 25 and the second transferring unit 41 in order to disengage a preselected belt, denoted by 2a, from the first dragging elements 26 and hold it in a predetermined positioning.

This stopping means 64 is preferably comprised of a pair of first thrust elements 65 facing each other and movable, upon command of respective stop actuators 66, close to and away from the first dragging elements 26, in a direction perpendicular to the extension of the active stretches 26a thereof.

In the embodiment shown the first thrust elements 65 are supported, together with the respective stop actuators 66, by the auxiliary framework 51 associated with the second transferring unit 41, and exactly operate along the first threshold line "S'", in a plane containing the axes of the second guide pulleys 28 belonging to the first transferring unit 25 and of the first guide pulleys 43 belonging to the second transferring unit 41.

Following the operation of the stop actuators 66, the first thrust elements 65 are moved close to each other and pushed laterally from opposite sides against one of the belts 2 interposed therebetween, causing a restriction of said belt in the junction area between the upper loop 38 and lower loop 39.

Therefore there is no longer a physical contact between the active stretches 26a of the first dragging elements 26 and the belt 2, said belt being suspended between the thrust elements 65 until the thrust elements are moved again away from each other.

Figure 4:
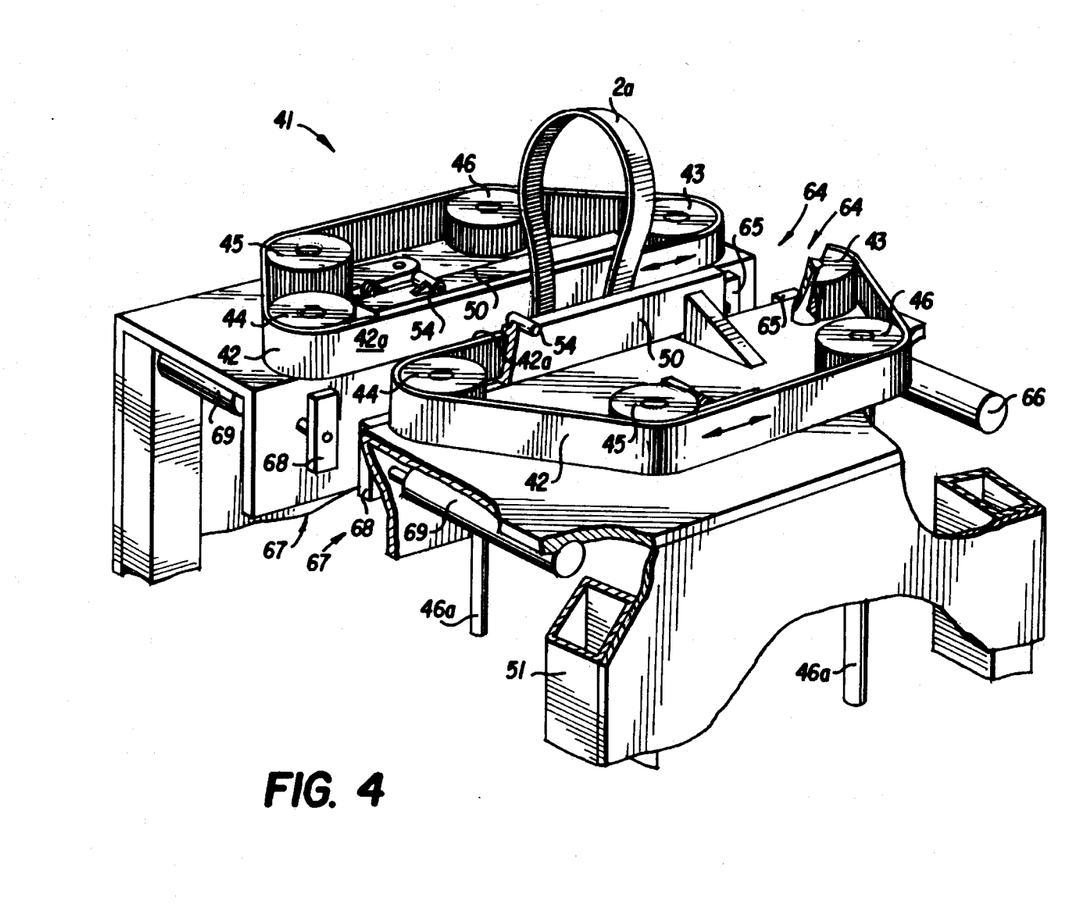
FIG. 4 is a perspective view showing a second transferring unit being part of the subject apparatus.

Second stopping means 67 (FIG. 4) are also provided and they act in register with a second threshold line "S''" (FIGS. 7 to 12) ideally defined between the second transferring unit 41 and the third transferring unit 55.

In the same manner as previously stated with reference to the first stopping means 64, the second stopping means 67 is comprised of a pair of second thrust elements 68 movable, upon command of second stop actuators 69, along the second threshold line "S''" which is defined in a plane containing the axes of the second guide pulleys 44 belonging to the second transferring unit 41 and of the first guide pulleys 57 belonging to the third transferring unit 55.

As the second thrust elements 68 move close to each other, one of the belts 2 interposed therebetween is disengaged from the third dragging elements 56 and held by the thrust elements themselves, for the purposes set forth in the following.

In this case too, the second thrust elements 68 and the actuators 69 are fastened to the auxiliary framework 51 belonging to the second transferring unit 41, and act under said guide pulleys 44, 57.

Obviously the first and second stopping means 64, 67 could also be mounted on the first and third transferring unit 25, 55 respectively, over the corresponding guide pulleys 28, 57.

Operation

The operating cycle of apparatus 1 in accordance with the present process is as follows.

First the handling support 3 carrying the belts 2 aligned along the supporting bar 4 will be engaged in the loading station 10 by sliding on rollers 11 so far that it hits the abutment element 12.

During this step the actuator 37 acting on the first guide counter-elements 35 keeps the active stretches 26a of the first dragging elements 26 spaced apart from each other, in order to enable the belts 2 to be inserted therebetween in a longitudinal direction.

When the handling support 3 bumps against the abutment element 12, the reading member 13 identifies data stored in the magnetic card 13a and transmits them to the electronic control box 14 that stores them in order to suitably drive the operation of apparatus 1 and work stations 5, 5a.

In particular, depending upon data detected on reading the magnetic card 13a, the electronic control box 14, if necessary, commands the replacement of pulleys 6 on the test station 5, through the set up means 7.

Preferably data contained in the magnetic card 13a should also indicate to the electronic control box 14 which of the belts 2 have been previously selected for being submitted to the quality control test.

Upon engagement of the handling support 3 in the loading station 10 the compacting means 15 is also operated in order to cause, as previously described, the arrangement in side by side relation of the belts 2 on the supporting bar 4, said belts being disposed in abutment against each other and against the fixed locator 24.

When the compacting step is over, the actuator 20 raises the counterbar 16 from the belts 2 and through the transverse-displacement actuators 37 the first guide counterelements 35 are urged against each other thereby making the active stretches 26a belonging to the corresponding first dragging elements 26 move close to each other.

As a result and as previously described, the belts 2 undergo an elastic deformation causing the formation of the upper loop 38 and lower loop 39 and the simultaneous raising of said belts from the supporting bar 4.

The belts 2, held by means of the active stretches 26a of the dragging elements 26, are then moved according to the longitudinal extension of the supporting bar 4, towards the second transferring unit 41, through the movement of the first dragging elements upon the action of the first driving motor 29.

Figure 7:
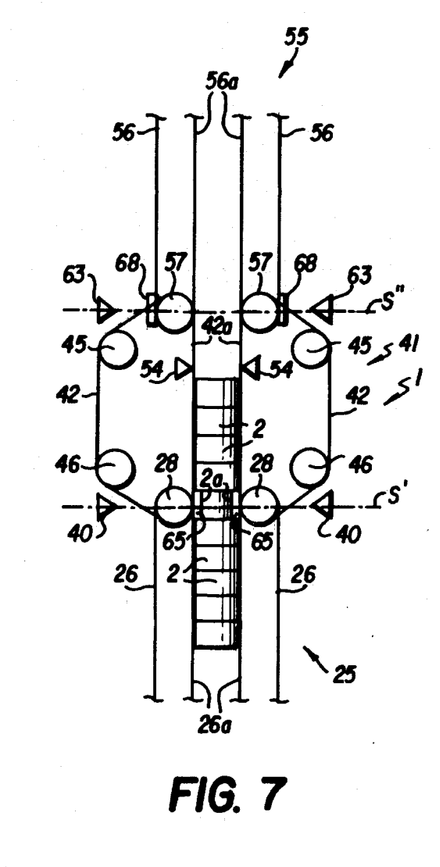
FIGS. 7 to 12 are diagrammatic top views of the apparatus showing the execution of further operating steps provided in the process of the invention.
Figure 8:
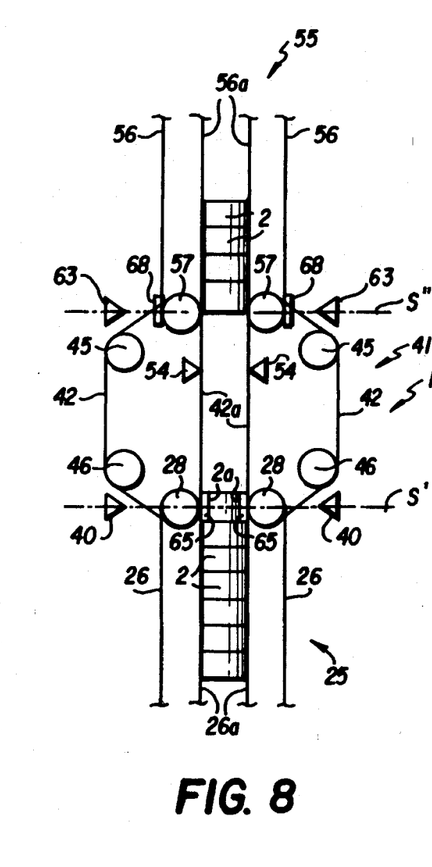

When the first photoelectric cell 40 detects the passage of the first one of belts 2 moving forward along the first transferring unit 25, the control box 14 counts, by means of the first encoder 30, the number of belts 2 leaving the first transferring unit 25 and engaging, as shown in FIG. 7, in the second transferring unit 41, the dragging elements 42 of which are operated by the second motor 47.

When a belt 2a previously selected to be transferred to the test station 5 is about to cross the first threshold line "S'", the first stop actuators 66 are activated and they make the respective thrust elements 65 move close to each other so that they engage the belt, while the movement of the first dragging elements 26 is at the same time stopped.

Obviously the belt 2a engaged during this step by the thrust elements 65 could also be the first one of belts 2 moved along the first transferring unit 25.

Figure 9:
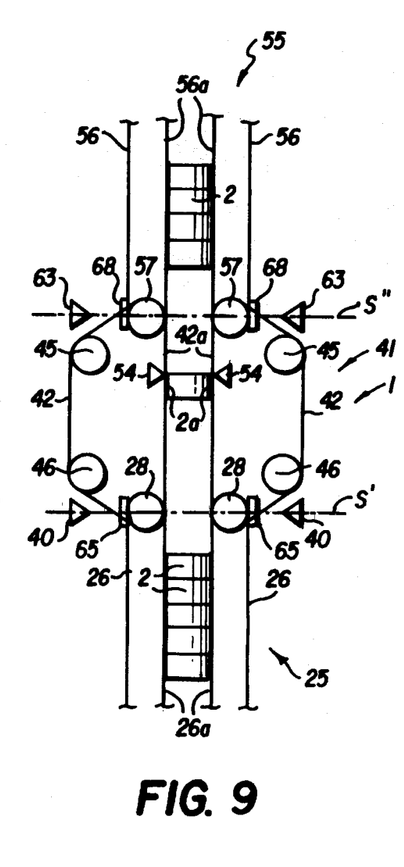
Figure 10:
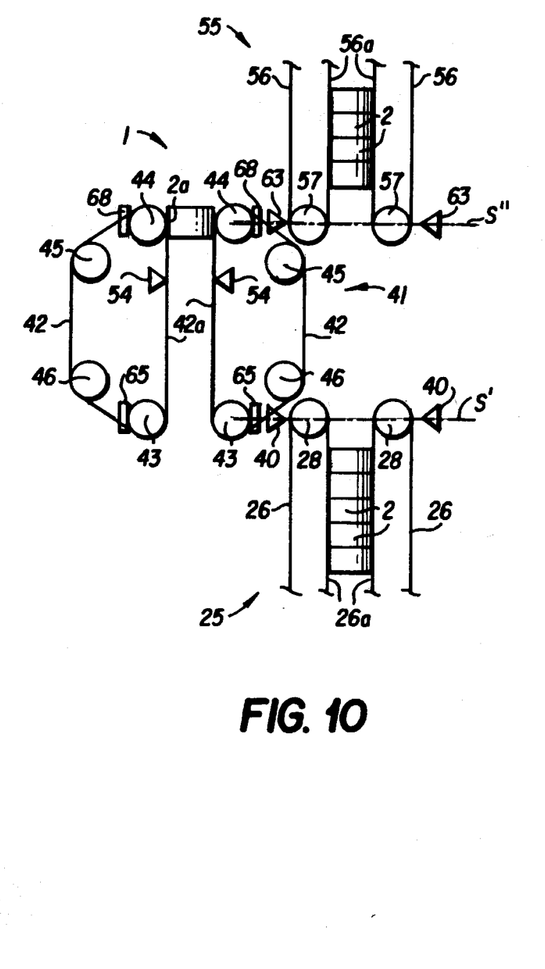
Figure 11:
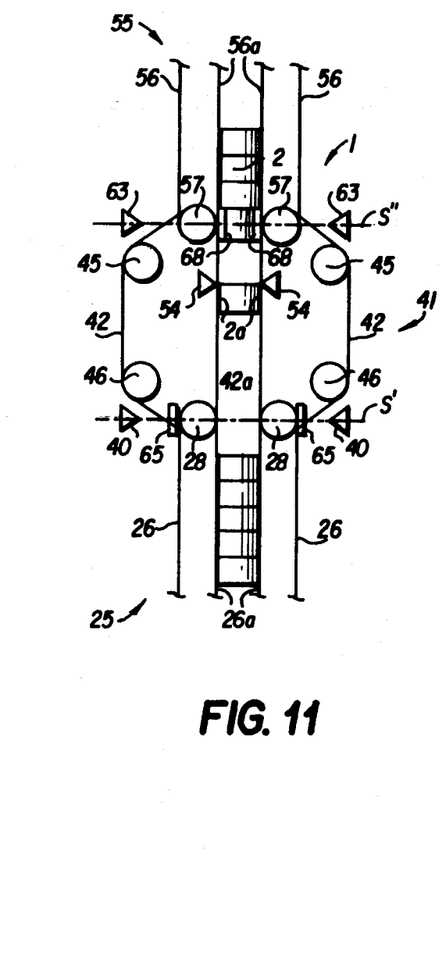
Figure 12:
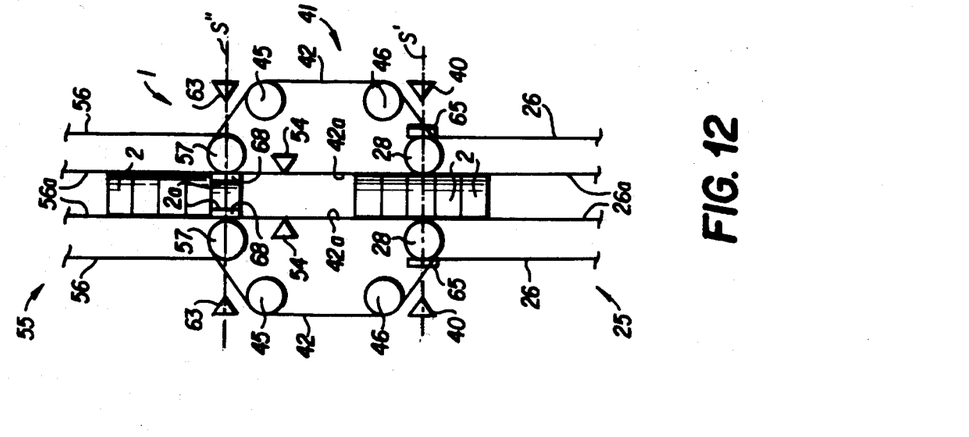

Possible belts 2 engaged by the second transferring unit 41 before the intervening of the thrust elements 65 are locked between the dragging elements 56 of the third transferring unit 55 and are moved away, as shown in FIG. 9, from the second threshold line "S''", by an amount sufficient to enable the side displacement of the second transferring unit without any risk of mechanical interference.

At the same time the dragging elements 26 belonging to the first transferring unit 25 are operated backwards relative to the preceding movement, so that the belts 2 located upstream of the preselected belt 2a are moved away from the second transferring unit 41 by an amount sufficient to enable the preselected belt 2a to be individually picked up by the second unit itself.

At this point the thrust elements 65 are moved again apart from each other so that the preselected belt 2a, by a short movement of the first dragging elements 26 towards the second transferring unit 41, is transferred between the active stretches 42a of the second dragging elements 42, still operated by the second motor 47.

The electronic control box 14 then controls the activation of the displacement actuator 53 and therefore the second transferring unit 41, with the preselected belt 2a, will be brought in front of the test station 5. During this step the belt 2 is carried along the path of the active stretches 42a of the second dragging elements 42 that are stopped when the belt itself reaches a predetermined position suitable to enable its being picked up by the handling unit 8.

The desired positioning of the belt 2 is obtained by enabling the second encoder 49 to control the movement of the second dragging elements 42 starting from the moment that the second photoelectric cell 54 detects the passage of the belt 2a by a predetermined point on the length of the active stretches 42a.

The preselected belt 2a will be therefore picked up by the handling unit 8 operatively engaging it between the pulleys 6 in order to enable the quality control test to be executed.

The modalities of the test are not herein described as they are not of importance to the ends of the invention and because they have already been discussed in detail in the above mentioned U.S. and Italian Patent Applications.

When the test is over, the handling unit 8 will pick up again the belt from pulleys 6 and engage it again between the active stretches 42a of the second transferring elements 42, exactly in the same position exhibited by the belt before it is removed by the second transferring unit.

If the quality control test has given a negative result the belt 2 will be rejected by the second transferring unit 41 through the movement of the second dragging elements 42 as far as the belt itself leaves the active stretches 42a in the region of the first guide pulleys 43, or the second guide pulleys 44.

The belt 2a thus rejected can be either conveyed to a reception vessel, or engaged by another transferring unit similar to the third transferring unit 55.

If, on the contrary, the quality control test has given a positive result the belt will be brought substantially in front of the second photoelectric cell 54 while the whole transferring unit 41 is moved from the second work position to the first work position, upon command of the displacement actuator 53.

At this point the dragging elements 56 associated with the third transferring station 55 are operated backwards in order to bring the last one of belts 2 engaged on the third transferring unit in register with the second threshold line "S''". When the third photoelectric cell 63 detects that said belt has reached the second threshold line "S''", the second thrust elements 68 are moved close to each other upon command of respective actuators 69 so as to suitably hold the belt.

The dragging elements 42 of the second transferring unit 41 are then activated to cause the belt 2a previously submitted to the quality control test to be moved towards the third transferring unit 55, so far that it comes in abutment against the belt 2 retained at the second threshold line "S''".

The achievement of this position by the belt carried by the second dragging elements 42 is detected through the counting carried out by the encoder 49 starting from the moment that the belt passes before the second photoelectric cell 54.

The second thrust elements 68 are then moved apart again from each other so that they release the previously engaged belt and enable the previously tested belt 2a to be transferred to the third transferring unit 55 through the simultaneous operation of the second and third dragging elements 42, 56.

More particularly, when the belt 2a to be submitted to the test is about to cross the second threshold line "S''", the second thrust elements 68 are again moved close to each other so that they may hold the belt. By a new operation of the first and second dragging elements 26, 42, other belts 2 are engaged in the second transferring unit 41 and brought into abutment with the belt 2a held at the second threshold line "S''", to be engaged in an orderly manner on the third transferring unit 55 before a new belt previously selected to undergo the quality control test is individually picked up by the second transferring unit 41, in the same manner as previously described.

Belts 2 engaged in an orderly manner on the third transferring unit 55 can be for example supplied to the packaging station 5a acting downstream of the third transferring unit or be transferred to a handling support similar to the one engaged in the loading station 10 and be transferred to any other place within the factory.

The present invention attains the intended purposes.

Actually, the present apparatus and the transferring process put into practice by said apparatus, which can be easily deduced from the description of the operating cycle of the apparatus itself enable the transport and sorting of the belts between different work stations to be carried out in a completely automated manner.

Advantageously, in the embodiment described the present apparatus can carry out the transferring and/or sorting of the belts both individually and in groups each comprising a plurality of belts.

In particular, in the embodiment described, the apparatus, by virtue of the interposition of the second transferring unit which is movable between the stationary first and third transferring units, enables the belts rejected after the control test to be separated from the accepted belts, which will be then consecutively aligned in an orderly manner on the third transferring unit 55. The arrangement of the belts 2 on the third transferring unit 55 in an orderly manner is adapted to permit the belts to be easily picked up by automatic members associated with a packaging apparatus for example, or another kind of apparatus.

It is obviously understood that modifications and variations can be made to the invention as conceived, all of them falling within the scope of the inventive idea.

In particular, it is to be noted that to the ends of the present invention the presence of the second transferring unit and the third transferring unit is not binding.

Actually, the first transferring unit 25 lends itself to be individually used for disengaging the belts 2 from the handling support 3 and arrange them for engagement with any other apparatus, either individually or in groups.

According to one embodiment the electronic control box 14 could be part of a system for the management of the whole belt production process and transmit information relating to the rejected belts to a memory for interventions in real time on the process steps that have caused the belt rejection.

We claim:

1. A process for handling driving belts in an automated manner, comprising the following steps:
   engaging a plurality of the driving belts about a generally horizontal supporting bar with the belts loosely hanging from the bar and holding the belts up only at an upper end thereof;
   elastically deforming the plurality of belts simultaneously and without stretching of the belts by pushing first dragging elements against outer sides of the belts laterally from opposite sides, said first dragging elements being located at a level lower than said horizontal supporting bar and spaced apart by a first width and substantially parallel to the supporting bar so as to give each belt a configuration having an upper loop with a second width greater than said first width and a lower loop in vertical alignment with said upper loop, each loop widening in a downward direction away from said first dragging elements;
   moving the belts along a longitudinal extension of the supporting bar by displacement of the first dragging elements.

2. A process according to claim 1 in which, prior to the step of the elastic deformation of the belts, a belt-compacting step is carried out in which the belts are pushed along said generally horizontal supporting bar and against a fixed locator so as to bring them into abutment against each other.

3. A process according to claim 1 including, simultaneously with said elastic deformation step, raising the upper ends of the belts together and upwards from the supporting bar.

4. A process according to claim 1, further comprising the following steps:
   stopping the moving of the belts when at least one preselected belt comes into engagement with second dragging elements which are aligned with the first dragging elements;
   moving said at least one preselected belt through the second dragging elements;
   dragging along the preselected belt to a work station located downstream from said first dragging element.

5. A process according to claim 4 in which, prior to the stopping step the following steps are carried out:
   elastically deforming the preselected belt further upon the action of two first thrust elements acting on the belt laterally from opposite sides, so as to release said belt from the first dragging elements;
   moving the belts upstream of said preselected belt away from the second dragging elements by means of a backward movement of the first dragging elements;
   restoring a primary elastic deformation of the preselected belt by moving the first thrust elements apart from the preselected belt itself so as to engage said preselected belt again with the first dragging elements;
   transferring the preselected belt to the second dragging elements through the displacement of the first dragging elements.

6. A process according to claim 4 in which, after the displacement of the preselected belt, the following steps are performed:
   picking up the preselected belt from the second dragging elements in order to submit it to an action of said work station;
   engaging the preselected belt between the second dragging elements;
   dragging the preselected belt along from the second dragging elements to third dragging elements;
   transferring said belt from the third dragging elements to a further work station.

7. A process according to claim 6 in which, prior to the transferring of the preselected belt to the further work station the following steps are carried out:
   positioning said preselected belt in general register with a threshold line S" defined between the second dragging elements and third dragging elements;
   fixing the positioning of the preselected belt;
   moving a plurality of further belts from the first dragging elements to the second dragging elements so as to bring at least one of said further belts into abutment with the previous preselected belt;
   moving the preselected belt together with other belts of said plurality of belts to the third dragging elements.

8. A process according to claim 6 in which, the preselected belt before being transferred to the third dragging elements, is brought into abutment with at least another belt previously positioned in general register with a threshold line S" defined between the second dragging elements and the third dragging elements.

9. Method for transferring a plurality of belts placed according to a predetermined order between different work stations, said method comprising the steps of
 a) hanging said plurality of belts having a predetermined order at an upper end of each belt, in cantilever fashion on a supporting bar;
 b) placing in a first station two first dragging elements comprising two active stretches facing parallel to each other in a longitudinal direction;
 c) moving apart from each other the two stretches;
 d) inserting the plurality of belts hung on the longitudinal supporting bar between the two stretches of the first dragging elements;
 e) elastically deforming the plurality of belts by moving the two active stretches of the first dragging element towards and against the belts laterally from outer opposite sides, said two stretches being spaced apart by a first width and substantially parallel to the supporting bar so as to give each of said plurality of belts a configuration having an upper loop with a second width greater than the first width and a lower loop in vertical alignment with said upper loop, each loop widening in a direction away from said first dragging elements and the upper ends of said plurality of belts being raised together and upwards from the supporting bar;
 f) moving the plurality of belts along the longitudinal extension of the supporting bar by the displacement of the first dragging elements so that the plurality of belts held in a predetermined order by means of the said two stretches are slipped off from the longitudinal supporting bar.

* * * * *